United States Patent
Grant

(10) Patent No.: US 11,424,992 B2
(45) Date of Patent: Aug. 23, 2022

(54) MESH COMMUNICATION NETWORK PROVISION

(71) Applicant: BRITISH TELECOMMUNICATIONS PUBLIC LIMITED COMPANY, London (GB)

(72) Inventor: Robert Grant, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 17/435,362

(22) PCT Filed: Feb. 26, 2020

(86) PCT No.: PCT/EP2020/055056
§ 371 (c)(1),
(2) Date: Aug. 31, 2021

(87) PCT Pub. No.: WO2020/178106
PCT Pub. Date: Sep. 10, 2020

(65) Prior Publication Data
US 2022/0078087 A1 Mar. 10, 2022

(30) Foreign Application Priority Data
Mar. 1, 2019 (EP) .................. 19160388

(51) Int. Cl.
*H04L 41/14* (2022.01)
*H04L 41/0654* (2022.01)
*H04L 43/045* (2022.01)

(52) U.S. Cl.
CPC ........ *H04L 41/145* (2013.01); *H04L 41/0654* (2013.01); *H04L 43/045* (2013.01)

(58) Field of Classification Search
None
See application file for complete search history.

(56) References Cited

U.S. PATENT DOCUMENTS 6,836,746 B2   12/2004   Coder et al.
6,836,756 B1   12/2004   Gruber
(Continued)

OTHER PUBLICATIONS

Combined Search and Examination Report dated Aug. 30, 2019 issued in GB Application No. GB1902809.1 (5 pages).
(Continued)

*Primary Examiner* — Diane L Lo
(74) *Attorney, Agent, or Firm* — Nixon & Vanderhye P.C.

(57) ABSTRACT

A method of provisioning mesh communication networks is disclosed. The method involves simulating the performance of a proposed network design to ensure the proposed network design meets service level criteria before provisioning a network in accordance with the proposed network design. Such simulations are required to be comprehensive because highly improbable events can be sufficient to result in a mesh network not meeting the stringent performance criteria which such networks are required to meet. Known methods of provisioning rely on exhaustively listing the mesh network states which would adversely impact the service offered by a proposed network design as part of simulating the performance of the proposed network design—this is an error prone exercise since relevant network states can be missed. A simulation technique is proposed in which the network state after each event is represented by a weighted graph indicating a measure of path cost for each of the links in the mesh network. A graph searching algorithm is applied to seek a path across the graph, thereby systematically exploring paths over mesh network which could provide a suitable route for the service in the simulated network state represented in the graph. Networks are thus provisioned which meet stringent performance criteria without being over-engineered.

20 Claims, 14 Drawing Sheets

| Link Component ID | Link Component Type | Failure Rate (failures per 10⁹ hours) | Mean Time To Repair (hours) i[4] | Mean Time to Expedited Repair (hours) | Dependent Links i[5] |
|---|---|---|---|---|---|
| A | Node | 50,000 | 8 | 4 | AC, AE |
| LCAC1 | Line Card | 100,000 | 48 | 4 | AC |
| LCAE1 | Line Card | 100,000 | 48 | 4 | AE |
| D1 | Duct | 20,000 | 48 | 24 | AC |
| D2 | Duct | 20,000 | 48 | 24 | AE |
| FAC | Fibre | 75,000 | 24 | 12 | AC |
| FAE | Fibre | 75,000 | 24 | 12 | AE |
| C | Node | 50,000 | 8 | 4 | AC, CE, CD |
| LCAC2 | Line Card | 100,000 | 48 | 4 | AC |
| LCCD1 | Line Card | 100,000 | 48 | 4 | CD |
| LCCE1 | Line Card | 100,000 | 48 | 4 | CE |
| D3 | Duct | 20,000 | 48 | 24 | CD,CE |
| • | • | • | • | • | • |
| • | • | • | • | • | • |
| • | • | • | • | • | • |
| G | Node | 50,000 | 8 | 4 | FG,DG,GB |
| LCGB1 | Line Card | 100,000 | 48 | 4 | GB |
| D12 | Duct | 20,000 | 48 | 24 | GB |
| FGB | Fibre | 75,000 | 24 | 12 | GB |
| LCDB2 | Line Card | 100,000 | 48 | 4 | DB |
| LCGB2 | Line Card | 100,000 | 48 | 4 | GB |
| B | Node | 50,000 | 8 | 4 | DB, GB |

(56) References Cited

U.S. PATENT DOCUMENTS

| 7,564,805 | B1 | 7/2009 | Cortez et al. | |
|---|---|---|---|---|
| 9,253,012 | B2 | 2/2016 | Ogawa et al. | |
| 9,722,912 | B2 | 8/2017 | Zhao et al. | |
| 2002/0091506 | A1* | 7/2002 | Gruber | H04L 43/0811 703/19 |
| 2010/0142408 | A1 | 6/2010 | Hajiaghayi | |
| 2010/0232299 | A1* | 9/2010 | Conway | H04L 41/145 370/242 |
| 2012/0253772 | A1 | 10/2012 | Conway | |
| 2017/0351241 | A1* | 12/2017 | Bowers | G05B 19/406 |
| 2020/0058081 | A1* | 2/2020 | Saneyoshi | G06Q 50/04 |
| 2020/0265331 | A1* | 8/2020 | Tashman | G06N 7/005 |

OTHER PUBLICATIONS

Waqar Ahmed, et al., "Reliability Modeling and Analysis of Communication Networks", Journal of Network and Computer Applications, vol. 78, 2017, 82 pages.

Thara Angskun, et al., "Reliability Analysis of Self-Healing Network using Discrete-Event Simulation", Seventh IEEE International Symposium on Cluster Computing and the Grid (CCGrid '07), 2007, pp. 437-444 (8 pages).

James A. Chisman, "Using Discrete Simulation Modeling to Study Large-Scale System Reliability/Availability", Computers & Operations Research, vol. 25, No. 3, 1998, pp. 169-174 (6 pages).

Adrian E. Conway, "Fast Simulation of service Availability in Mesh Networks with Dynamic Path Restoration", IEEE/ACM Transactions on Networking, IEEE, vol. 19, No. 1, Feb. 2011, pp. 92-101 (10 pages).

Javier Faulin, et al., "Using simulation to determine reliability and availability of telecommunication networks", European Journal of Industrial Engineering, vol. 1, No. 2, 2007, pp. 131-151 (21 pages).

Javier Faulin, et al., "Predicting availability functions in time-dependent complex systems with SAEDES simulation algorithms", Reliability Engineering & System Safety, vol. 93, Issue 11, available Mar. 29, 2008, pp. 1761-1771 (11 pages).

Marcel Held, et al., "Availability Calculation and Simulation of Optical Network Systems," Proc. SPIE 4940, Reliability of Optical Fiber Components, Devices, Systems, and Networks, Apr. 30, 2003, pp. 163-173 (12 pages).

Marcel Held, et al., "Consideration of connection availability optimization in optical networks", Fourth International Workshop on Design of Reliable Communication Networks (DRCN 2003), Proceedings., Oct. 19-22, 2003, pp. 173-180 (8 pages).

Yinan Jiang, et al., "The Method of Network Reliability and Availability Simulation Based on Monte Carlo", 2012 International Conference on Quality, Reliability, Risk, Maintenance, and Safety Engineering, 2012, pp. 245-250 (6 pages).

Angel A. Juan, et al., "Applications of Discrete-Event Simulation to Reliability and Availability Assessment in Civil Engineering Structures", Proceedings of the 2009 Winter Simulation Conference (WSC), 2009, pp. 2759-2767 (9 pages).

Rajendra Kumar, et al., "Accurate Reliability Modeling using Markov Analysis with Non-Constant Hazard Rates", 2009 IEEE Aerospace Conference, 2009, 7 pages.

John Y. Lin, et al., "A Monte Carlo Simulation to Determine Minimal Cut Sets and System Reliability," Annual Reliability and Maintainability Symposium, 1993 Proceedings, pp. 246-249 (4 pages).

Gerard p. O'Reilly, et al., "Telecom Critical Infrastructure Simulations: Discrete Event Simulation vs. Dynamic Simulation How Do They Compare?", IEEE GLOBECOM 2007—IEEE Global Telecommunications Conference, 2007, pp. 2597-2601 (5 pages).

Ioan Palade, "Reliability and availability engineering for VoIP communications systems," 2010 8th International Conference on Communications, 2010, pp. 309-312 (4 pages).

Slavko Pokorni, et al., "Reliability Estimation of a Complex Communication Network by Simulation", 2011 $19^{th}$ Telecommunications Forum (TELFOR) Proceedings of Papers, Nov. 22-24, 2011, pp. 226-229 (4 pages).

James R. Swisher, et al., "Discrete-Event Simulation Optimization Using Ranking, Selection, and Multiple Comparison Procedures: A Survey", ACM Transactions on Modeling and Computer Simulation, vol. 13, No. 2, Apr. 2003, pp. 134 154 (21 pages).

Extended EP Search Report for EP Application No. 19160388.5 dated Jun. 14, 2019, 9 pages.

International Preliminary Report on Patentability for PCT/EP2020/055056 dated Feb. 22, 2021, 13 pages.

International Search Report for PCT/EP2020/055056 dated Mar. 19, 2020, 6 pages.

Written Opinion of the ISA for PCT/EP2020/055056 dated Mar. 19, 2020, 7 pages.

\* cited by examiner

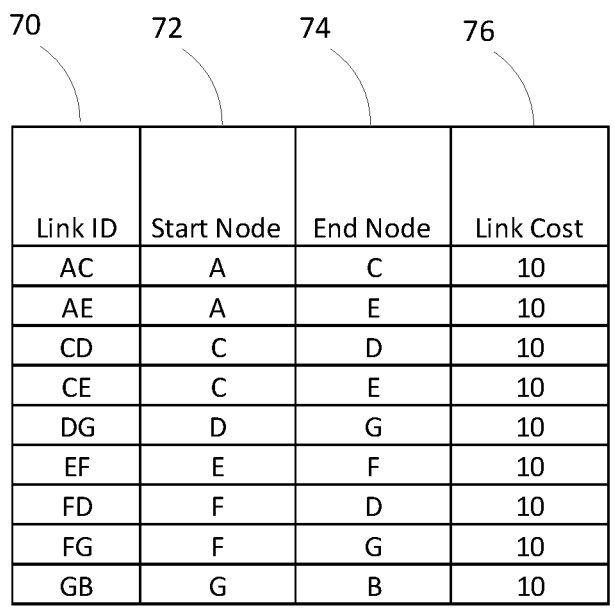
Figure 4 (links)

| Link Component ID | Link Component Type | Failure Rate (failures per 10⁹ hours) | Mean Time To Repair (hours) i[4] | Mean Time to Expedited Repair (hours) | Dependent Links i[5] | Next Failure Time i[6] | Next Repair Time i[7] | Link Component Status i[8] |
|---|---|---|---|---|---|---|---|---|
| A | Node | 50,000 | 8 | 4 | AC, AE | 10,420 | 10,425 | Up |
| LCAC1 | Line Card | 100,000 | 48 | 4 | AC | 150 | 209 | Up |
| LCAE1 | Line Card | 100,000 | 48 | 4 | AE | 7,596 | 7,648 | Up |
| D1 | Duct | 20,000 | 48 | 24 | AC | 28,166 | 28,212 | Up |
| D2 | Duct | 20,000 | 48 | 24 | AE | 123,119 | 123,168 | Up |
| FAC | Fibre | 75,000 | 24 | 12 | AC | 1,268 | 1,298 | Up |
| FAE | Fibre | 75,000 | 24 | 12 | AE | 2,023 | 2,048 | Up |
| C | Node | 50,000 | 8 | 4 | AC, CE, CD | 13,185 | 13,195 | Up |
| LCAC2 | Line Card | 100,000 | 48 | 4 | AC | 19,151 | 19,211 | Up |
| LCCD1 | Line Card | 100,000 | 48 | 4 | CD | 1,919 | 1,978 | Up |
| LCCE1 | Line Card | 100,000 | 48 | 4 | CE | 5,339 | 5,382 | Up |
| D3 | Duct | 20,000 | 48 | 24 | CD,CE | 116,540 | 116,597 | Up |
| • | • | • | • | • | • | • | • | • |
| • | • | • | • | • | • | • | • | • |
| • | • | • | • | • | • | • | • | • |
| G | Node | 50,000 | 8 | 4 | FG,DG,GB | 31,519 | 31,527 | Up |
| LCGB1 | Line Card | 100,000 | 48 | 4 | GB | 4,833 | 4,877 | Up |
| D12 | Duct | 20,000 | 48 | 24 | GB | 34,639 | 34,703 | Up |
| FGB | Fibre | 75,000 | 24 | 12 | GB | 521 | 543 | Up |
| LCDB2 | Line Card | 100,000 | 48 | 4 | DB | 23,502 | 23,547 | Up |
| LCGB2 | Line Card | 100,000 | 48 | 4 | GB | 8,779 | 8,822 | Up |
| B | Node | 50,000 | 8 | 4 | DB, GB | 121,672 | 121,680 | Up |

Figure 5

| Lifetime Number | Time of Event (Hours) | Link Component ID | Type of Event | Post-Event Least Cost Path | Cost of Post-Event Least Cost Path | Service Availability |
|---|---|---|---|---|---|---|
| 1 | 0 | — | No Failures | A - C - D - B | 30 | Up |
| 1 | 191 | B | Failed, rerouted | A - C - D - B | 1,000,020 | Down |
| 1 | 195 | B | Repaired, rerouted | A - C - D - B | 30 | Up |
| • | • | • | • | • | • | • |
| 1 | 7,877 | LCFD1 | Failed | A - C - D - B | 30 | Up |
| 1 | 7,928 | LCGB1 | Failed | A - C - D - B | 30 | Up |
| 1 | 7,930 | LCFD1 | Repaired | A - C - D - B | 30 | Up |
| 1 | 7,958 | LCAE2 | Failed | A - C - D - B | 30 | Up |
| • | • | • | • | • | • | • |
| 1 | 38,479 | A | Failed, rerouted | A - C - D - B | 1,000,020 | Down |
| 1 | 38,485 | A | Repaired, rerouted | A - C - D - B | 30 | Up |
| • | • | • | • | • | • | • |
| 2 | 0 | No Failures | No Failures | A - C - D - B | 30 | Up |
| 2 | 23 | FFD | Failed | A - C - D - B | 30 | Up |
| 2 | 47 | FFD | Repaired | A - C - D - B | 30 | Up |
| 2 | 261 | LCAC1 | Failed, rerouted | A - E - F - G - B | 40 | Up |
| 2 | 310 | LCAC1 | Repaired, rerouted | A - C - D - B | 30 | Up |
| • | • | • | • | • | • | • |
| 2 | 11,459 | D7 | Failed | A - C - D - B | 30 | Up |
| 2 | 11,500 | LCCD1 | Failed, rerouted | A - C - D - B | 1,000,020 | Down |
| 2 | 11,520 | D7 | Repaired, rerouted | A - E - F - G - B | 40 | Up |
| 2 | 11,560 | LCCD1 | Repaired, rerouted | A - C - D - B | 30 | Up |
| • | • | • | • | • | • | • |

Figure 6

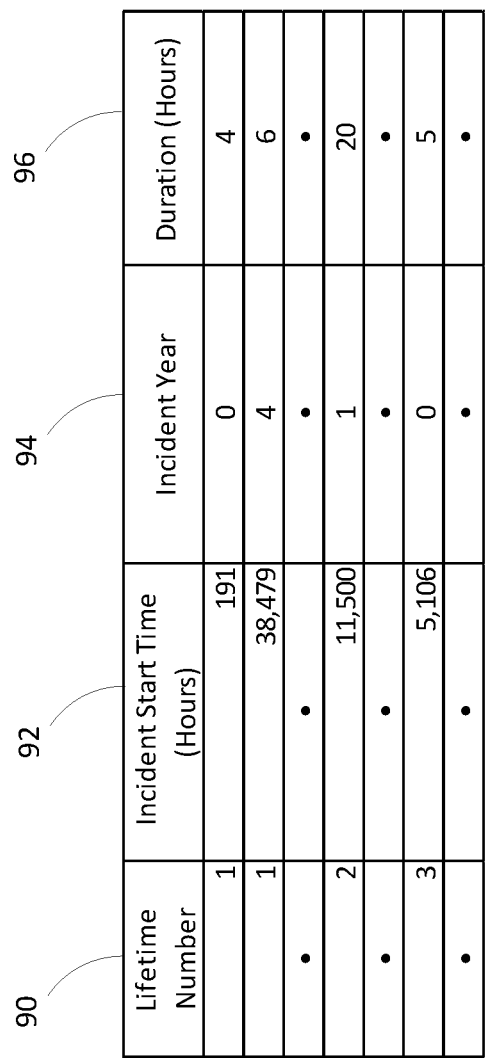
Figure 7 (incidents)

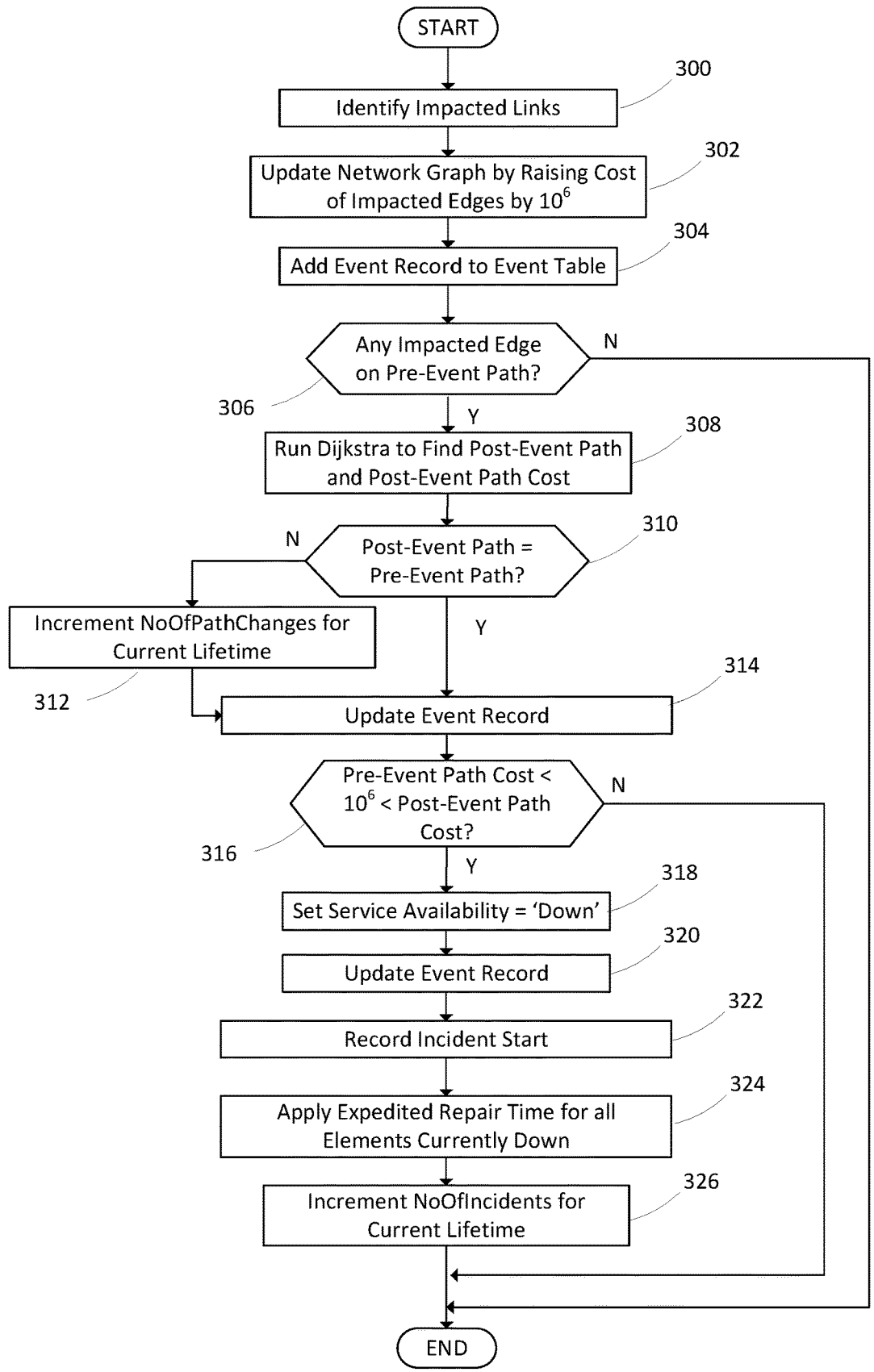
Figure 10A (Failure Simulation)

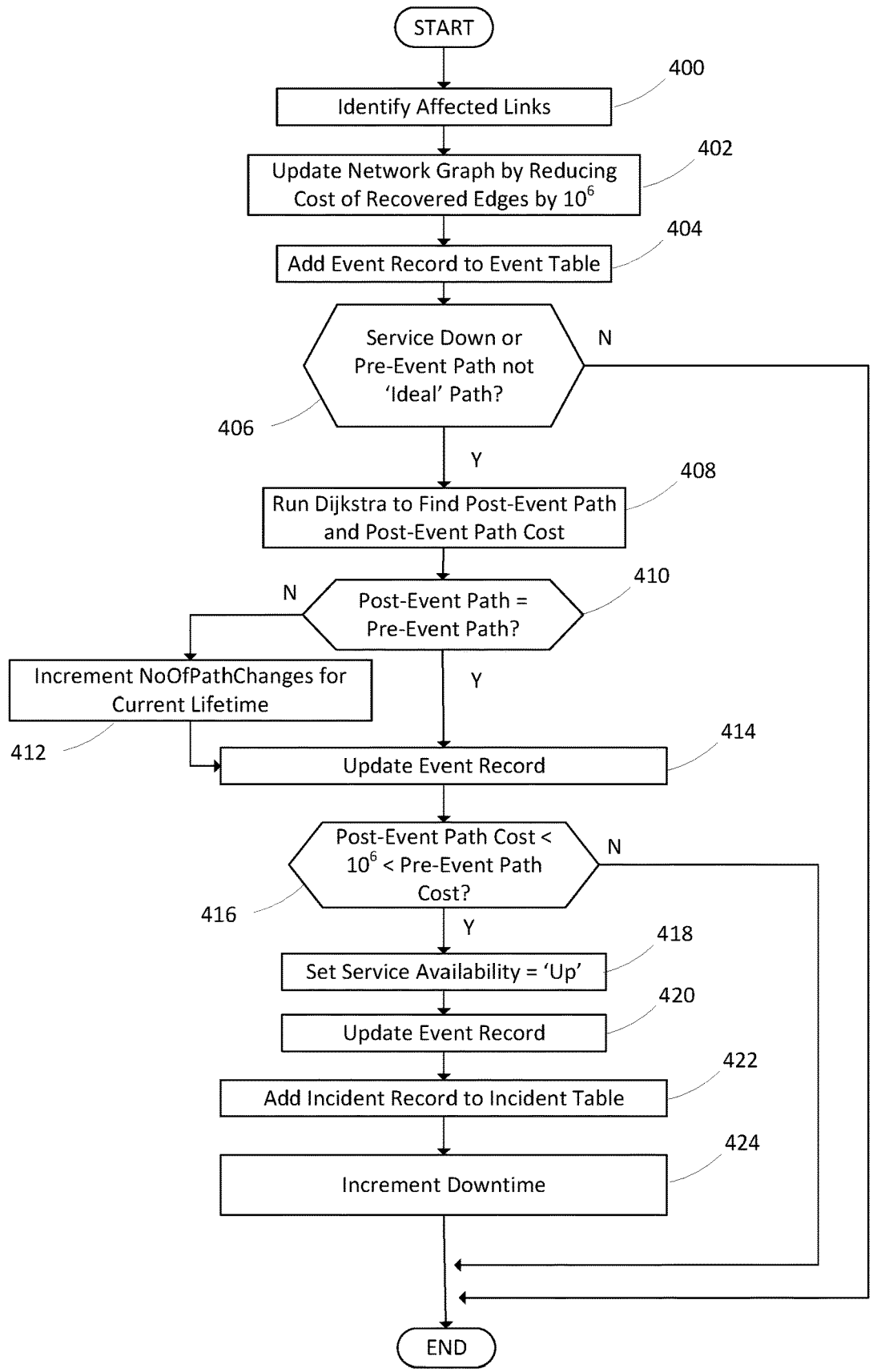
Figure 10B (Repair Simulation)

MESH COMMUNICATION NETWORK PROVISION

This application is the U.S. national phase of International Application No. PCT/EP2020/055056 filed Feb. 26, 2020 which designated the U.S. and claims priority to EP Patent Application No. 19160388.5 filed Mar. 1, 2019, the entire contents of each of which are hereby incorporated by reference.

FIELD OF THE INVENTION

The present invention relates to the provision of mesh communication networks. It is of particular utility in the provision of mesh communication networks offering predetermined service levels.

BACKGROUND TO THE INVENTION

Providing a new communications network requires a large capital outlay from the network operator, and that investment is only justified if revenue from that network more than covers the initial capital outlay. The revenue from operating a network often depends on the network providing service levels agreed with customers. Because of this, prior to actually provisioning a new communications network, network operators simulate the operation of the proposed network in order to verify that the proposed network will provide an acceptable service level, and, if not, the network operator amends the proposed network design until it does provide an acceptable service level, and then provisions a network according to the proposed network design.

Similarly, to avoid a failure to meet agreed service levels in an existing network, before making changes to a network (including, for example, planned engineering works), the operation of the changed network is simulated before the change is actually made to the network.

Many network simulation techniques involve simulating a large number of network states. To obtain estimates of availability measures from such network simulations, those network states are checked to see whether the network would provide a given service when in that state. From aggregating results over many possible network states, it is possible to derive statistical estimates of the availability of a given service offered over a proposed network.

Different methods of generating the large number of network states are known in the art. In some cases, each network state is generated independently of previously generated network states. In other cases (e.g. Discrete Event Simulation), each state is generated by starting with the previous state and then changing the state in accordance with the next event in a series of network events. Markov modeling involves enumerating all the possible states of the network, and the transitions between those states, and probabilistically choosing from amongst the possible transitions from the current network state.

U.S. Pat. No. 6,836,756 (Gruber) discloses a time simulation technique for determining service availability of particular connections in a mesh network.

A paper entitled "Predicted availability functions in time-dependent complex systems with SAEDES simulation algorithms" by Javier Faulin et al in Reliability Engineering and System Safety, vol. 93 (2008), pp 1761-1771, teaches the use of Discrete Event Simulation in predicting the availability of a service provided over a network.

Because failures of network components are rare, and the levels of service demanded by customers are very high, a huge number of possible network scenarios must be simulated before an accurate prediction of a measure of the performance offered by a network over time can be provided. Existing network simulation techniques require sets of states in which performance is adversely affected to be exhaustively specified in advance of a simulation. Producing such an exhaustive specification is error prone (relevant network states can be missed). The result is that networks are provisioned which are either meet the required service levels by being over-engineered, or alternatively fail to meet the required service levels. There is a need for a more reliable method of network provision.

SUMMARY OF THE INVENTION

According to a first aspect of the present invention, there is provided a computer-implemented method of provisioning a mesh communications network according to a network design, the design defining an arrangement of nodes and links therebetween for providing a service involving communication between a source node and a target node, the method comprising:

modeling the network design as a graph data structure in which edges correspond to links and vertices correspond to nodes;

iteratively adjusting the graph to represent failures and corresponding repairs to nodes and/or links, and for at least selected graph adjustments, evaluating a path through the network from the source node to the target node so as to estimate a measure of the performance of the network design across the iterations;

provisioning the mesh network responsive to the measure of performance satisfying a predetermined criterion.

It is to be understood that 'repair' includes various methods of fixing the failure, including replacing the node, link, node component, or link component that has failed.

By modeling the network design as a graph data structure in which edges correspond to links and vertices correspond to nodes, iteratively adjusting the graph to represent a plurality of failures and corresponding repairs to nodes and/or links, and for at least some of the graph adjustments (including adjustments relating to repairs as well as adjustments relating to failures), evaluating a path through the network from the source node to the target node so as to evaluate a measure of the performance of the network design across the iterations; and provisioning the mesh network responsive to the measure of performance satisfying a predetermined criterion, a method of network provision is provided which is more reliable that prior methods of network provision.

In some embodiments, evaluating a path so as to estimate a measure of the performance of the network design across the iterations comprises seeking a path so as to evaluate availability of the service across the iterations.

The availability of the service is an important factor in assessing whether a network meets a required service level. Availability measures for a service are indicative of the fraction of time for which the service is available. Availability service levels demanded by customers and provided by network operators are very high—availability service levels are often in the range 99.9% ('three nines') to 99.9999% ('six nines'). A network simulation needs to model the performance of the network to an extremely high accuracy in order to reliably predict whether such availability measures will in fact be met.

In some embodiments, evaluating availability of the service across the iterations comprises, for each graph adjustment: i) recording a time of service loss if a path was available before the graph adjustment, but no path is available following the graph adjustment; and ii) recording a time of service recovery if no path was available before the graph adjustment, but a path is available following the graph adjustment; and evaluating availability of the service across the iterations by calculating estimates of one or more measures of the availability of the service from the recorded times of service loss and service recovery.

In some embodiments, the plurality of failures and corresponding repairs are represented by i) a plurality of node or link failure events, each relating to a node or link in the mesh network and including a stochastically generated time of failure of the node or link; and ii) a plurality of corresponding node or link repair events, each including a time of repair of the node or link; and adjusting the graph comprises applying the failure or repair events in chronological order to adjust the graph representing the mesh network from a pre-event iteration to a post-event iteration for each failure and repair event. Having times associated with failure or repair events in this way enables the time of a failure or repair event to be set or reset in response to a graph adjustment. For example, if the adjustment to the graph represents the service becoming unavailable, repair events corresponding to all failed nodes, links, node components or link components in the network could be expedited, or repair events corresponding to all failed nodes, links, node components or link components on a least cost path for the service could be expedited.

In some embodiments, the plurality of failures and corresponding repairs are represented by: i) a plurality of node or link failure events, each relating to a node or link in the mesh network and including a stochastically generated time of failure of the node or link; and ii) a plurality of corresponding node or link repair events, each including a time of repair of the node or link; and adjusting the graph comprises applying the failure or repair events in chronological order to update the graph representing the mesh network from a pre-event iteration to a post-event iteration for each failure and repair event. In some cases, the method further comprises stochastically generating the times of failures of nodes and/or links.

In some embodiments, the graph comprises a weighted graph, wherein the weights represent a measure of path cost based on attributes of edges included in the path, and evaluating a path through the network comprises performing a least cost routing algorithm to seek a least cost path from a vertex representing the source node to a vertex representing the destination node. In a subset of these embodiments, the least cost routing algorithm is Dijkstra's algorithm.

'Least cost' should be read broadly to apply to many different possible types of weights. In some embodiments, each operational link is given an operational weight. In other embodiments, the default operational cost for a link is zero, and a negative weight is added in relation to each link for each failure of an element on which that link depends, with the path having the highest cost value then being taken to be the 'least cost' path.

In some embodiments, the selected graph adjustments are selected by only seeking a path through the network from the source node to the target node if the graph adjustment indicates the failure of a link on the current least cost path. This has the advantage that running the least cost routing algorithm is carried out selectively, thereby allowing a greater number of network states to be assessed which in turn results in the provisioning a network which more reliably meets required service levels.

In some embodiments, the method further comprises operating the computer to store an operational dependency mapping representing an operational dependency of one or more links in the mesh network on one or link components, wherein adjusting the graph includes mapping a link component failure event or link component repair event to a change to one or more edges in the graph based on the operational dependency mapping. This allows a more fine-grained simulation which takes account of the dependency of links upon many different constituent elements (e.g. line cards, ducts, fibres), rather than a more coarse-grained simulation in which the network elements comprise nodes and/or links, and the generated events simply represent failures and repairs of the nodes and/or links. It also allows for more complex dependencies which would otherwise be missed—for example the severing of a duct can cause the failure of all the links which involve transmission over fibres, cables or wires running through that duct.

In some examples of the more fine-grained simulation, the graph comprises a weighted graph and the change to the edge in the graph comprises attributing a cost to the edge which is indicative of the number of link components which would need to be repaired in order to return the link to an operational state.

In some embodiments, the measure of performance comprises the availability of the path from the source node to the target node, the method further comprising recording times of failure and repair events across the iterations on a common timeline. This provides a computationally efficient method of simulating the impact of multiple as-yet-unrepaired failure events, and enables the subsequent production of availability measures over chosen time periods (e.g. in each year of network operation from the launch of a brand new network).

BRIEF DESCRIPTION OF THE FIGURES

Embodiments will now be described, by way of example only, with reference to the accompanying drawings in which:

FIG. 4 is a network topology table including operational link costs used in a least cost routing algorithm applied to each iteration of the network graph;

FIG. 5 shows the table of FIG. 3 augmented with initial failure and repair times generated for the link components in one simulated network lifetime;

FIG. 6 is a table of events and their impact on performance of the proposed network design;

FIG. 7 is a table of periods of unavailability of the service generated over a plurality of simulated network lifetimes.

FIG. 10A is a flowchart showing how the impact of a network element failure event is simulated;

FIG. 10B is a flowchart showing how the impact of a network element repair event is simulated;

DETAILED DESCRIPTION OF EMBODIMENTS

Figure 1:
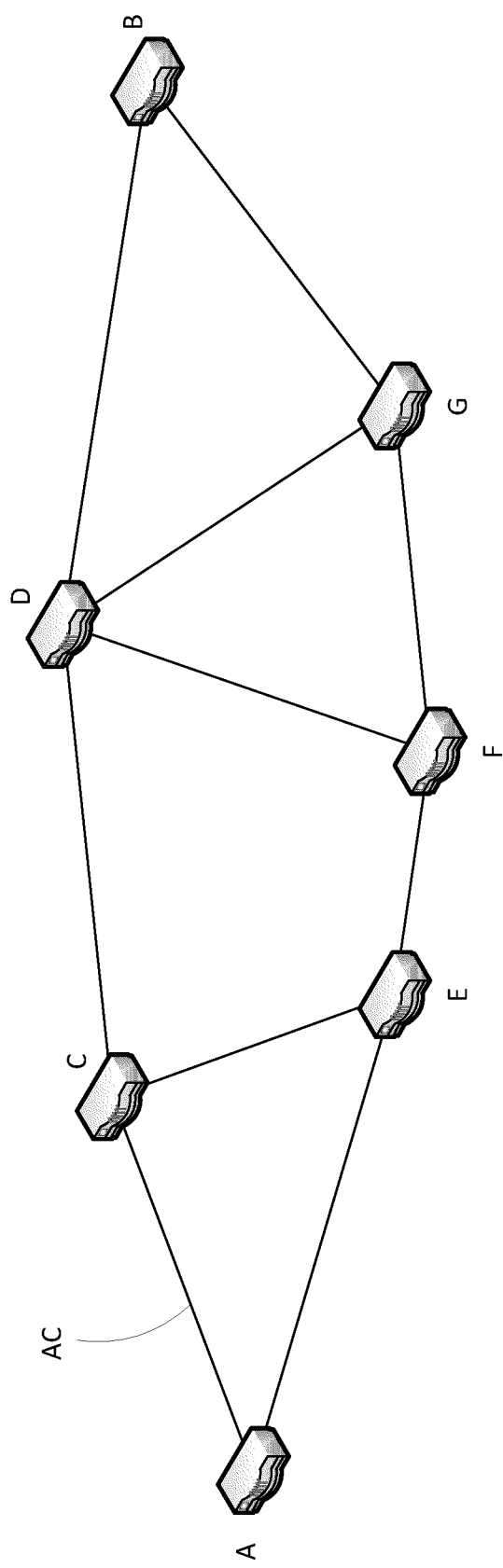
FIG. 1 shows an example of a proposed mesh network design.

The operation of the present embodiment will be illustrated by reference to a proposed mesh network design (FIG. 1). The aim of the present embodiment is to provision a mesh network which meets predetermined criteria—in this example, the predetermined criteria relate to availability of a service providing communication between source node A and destination node B, and the stability in the path used for providing that communication. The proposed mesh network design comprises a set of seven nodes (A-G) and ten links (AC-GB) between those nodes.

The present embodiment can be applied to any mesh network which can be represented as a graph—i.e. as a set of vertices representing network nodes and set of edges representing links between the nodes. It will be understood by those skilled in the art that, in practice, mesh networks may have considerably more nodes and links than the mesh network illustrated in FIG. 1. The embodiment can also be applied to any choice of start node and destination node.

The computer (FIG. 2) used in this embodiment to establish whether a proposed mesh network design provides a service which meets predetermined criteria comprises a central processing unit 20, a volatile memory 22, a read-only memory (ROM) 24 containing a boot loader program, and writable persistent memory—in this case in the form of a solid state disk 26. The processor 20 is able to communicate with each of these memories via a communications bus 28.

Also communicatively coupled to the central processing unit 20 via the communications bus 28 is a network interface card 30. The network interface card 30 provides a communications interface from the service availability estimation computer enabling the output of a network design which meets the predetermined criteria, via communication links to the network operator's intranet or the Internet.

The solid state disk 26 of the network design test computer stores an operating system program 40, and a network design testing application 34 which includes a network graph iterator 36, and a path evaluator 38.

Also stored on the solid state disk 26, is a table of link records 42 identifying links in the mesh network to be simulated, and a table of link component records 44 listing the link components used in the network and the operational dependencies of the links on those link components.

As the network design tester 34 runs, it builds a table of event records 46, and a table of loss of service records 48.

Each link component record (FIG. 3) includes a link component ID 50, a link component type 52, link component reliability data 54, link component maintainability data 56, 58 and an operational dependency mapping—in this example, the operational dependency mapping takes the form of a list, provided for each link component, of the links 60 which require the link component to be operational in order to be operational themselves.

In the present example, the link component reliability data 54 takes the form of the number of failures expected in one billion hours of operation. By way of example, alternative forms of link component reliability data include the mean time to failure, and probability of failure in a year of operation. Furthermore, components could be given a failure rate that changes with age which can be modeled, for example, by providing parameters for a Weibull function. A person skilled in the art will be aware of yet further forms of link component reliability data which could be used in the present embodiment.

In the present example, the link component maintainability data takes the form of a mean time to repair and a mean time to expedited repair. In other embodiments, only a mean time to repair might be given, or a fixed time to repair could be associated with each link component type.

Each link record (FIG. 4) includes a link ID 70, a start node ID 72, an end node ID 74, and a link cost 76. In this example, the link cost is initialised to a default value which applies when the link is in an operational state. As will be explained below, the link cost can be increased each time one of the link components upon which the operation of a link depends (in this example, the links set out in the rightmost column of FIG. 3) fails, and decreased each time one of those link components is repaired.

In the present example, each link is assumed to be bidirectional and has the same cost associated with it in either direction. Those skilled in the art will be able to modify the present example to consider the two directions of the link separately.

Figure 2:
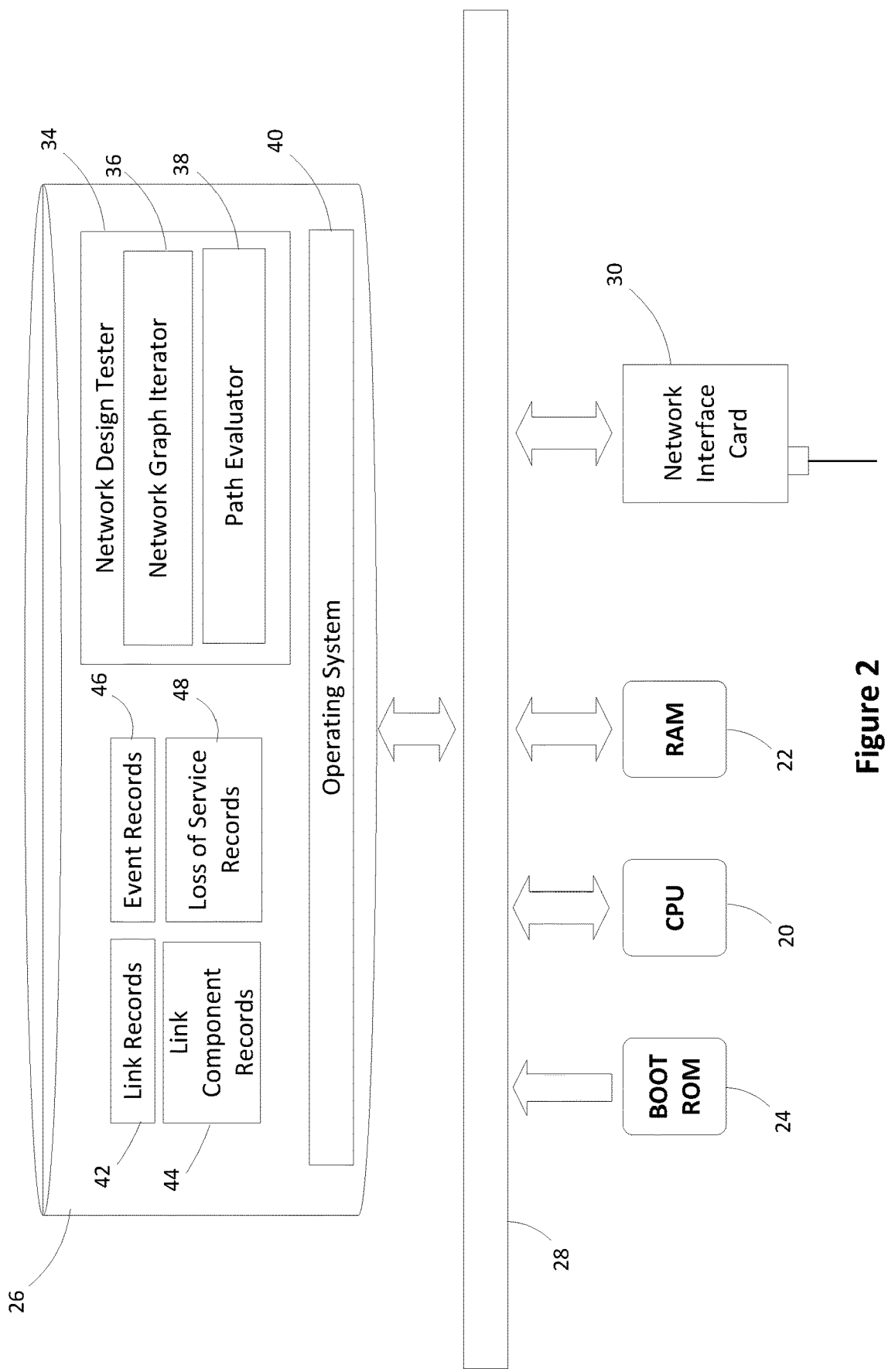
FIG. 2 shows a computer arranged in operation to simulate the operation of proposed mesh network designs.

In this embodiment, the link component records and link records are uploaded to the computer (FIG. 2). In other embodiments, a graphical user interface could be provided which enables a user to enter the link component and link information manually, or the link components records and link records could be downloaded from a network inventory system. A facility for manually amending the proposed network design between network tests is provided in some embodiments.

As the network graph iterator (FIG. 2, 34) runs, the link component records (FIG. 3) are augmented (FIG. 5) with a next failure time 62 and a next repair time 64 (the way in which these times are initialised and subsequently updated will be explained below with reference to FIGS. 9A to 10B). In this example, the link component state is recorded as 'up' (i.e. operational) or 'down' (i.e. failed). Also, in this example, the initial network state has all elements in an operational state—in other examples, the network state could, for example, be a current state of an existing communications network as gathered from a network management system.

In the present embodiment, Discrete Event Simulation is used to generate several sequences of network states (such sequences of network states being referred to here as network lifetimes). As will be explained with reference to FIGS. 9A to 10B below, link component failure events are generated by stochastically generating a failure time for each link component, and corresponding link component repair events are then added.

The event table 46 (FIG. 6) records, for each link component failure or repair event, the number of the simulated lifetime in which the event occurred 70, the time of the event (in hours after the beginning of the simulated lifetime) 72, the link component 73 which is the subject of the event, the type of the event 74—in particular whether the event is a link component failure event or a link component repair event, and also whether the event caused the least cost routing algorithm to be run for the post-event network state, the post-event least cost path 76 found in the post-event network state, the cost 78 of the post-event path, and the service availability after the event.

The incident table 48 (FIG. 7) records each period of loss of service. Each period of loss of service is recorded in an incident record which includes the number of the lifetime in which the incident occurred 90, the time at which the incident started 92 (in hours from the beginning of the lifetime), the year 94 of the lifetime in which the incident occurred (it is useful to be able to provide an availability measure for each year of network operation—especially if the link component reliability data sets out how the reliability of the link component varies with age), and the duration of the period of loss of service 96.

Figure 8A:
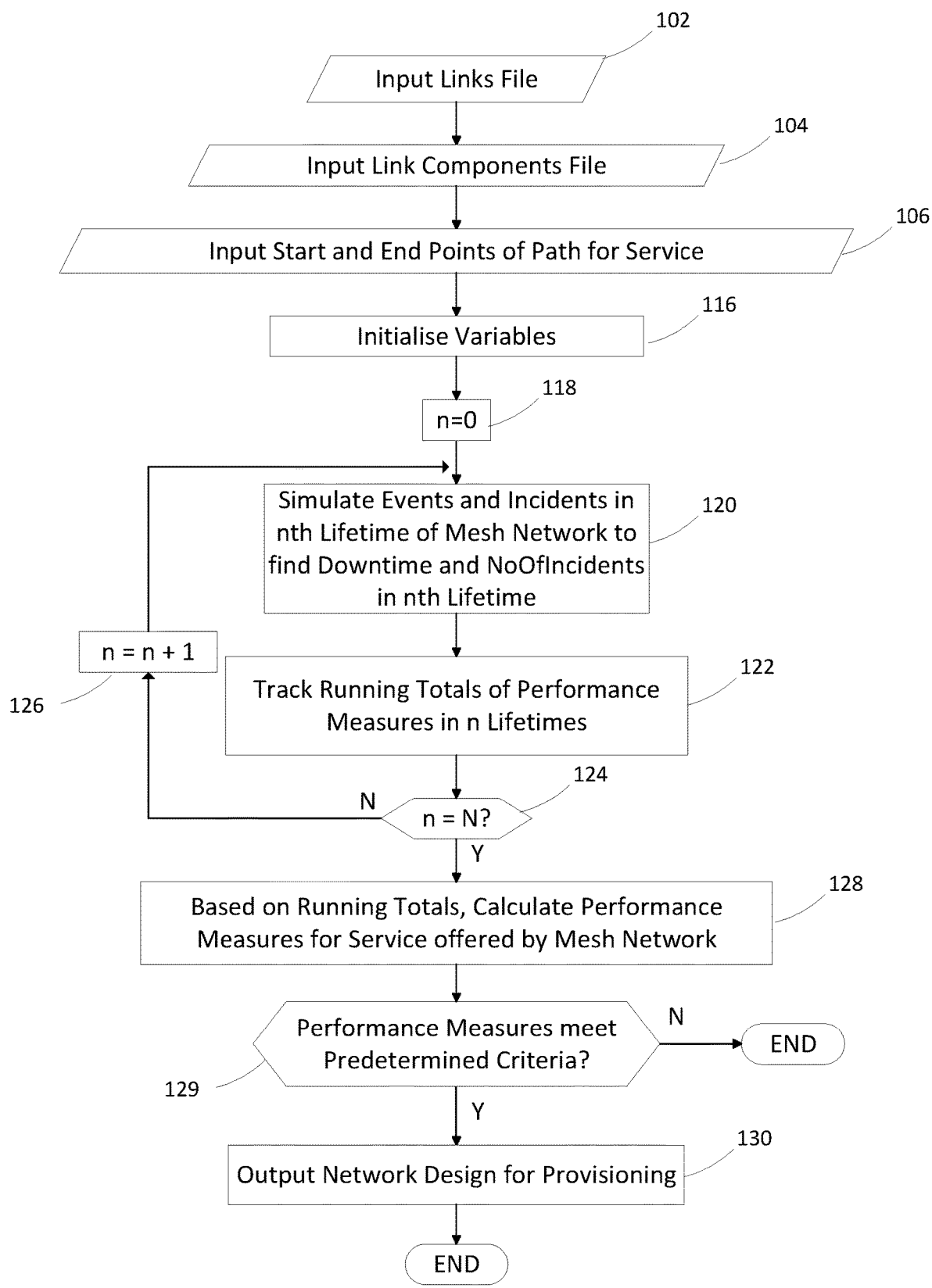
FIG. 8A is a flow-chart showing the generation of a network design for provisioning.

The overall operation of the network design testing application (FIG. 8A) begins with loading 102, 104 a links file and a link components file onto the computer, and reading the records from those files into the links table 42 and link components table 44 respectively. In this particular example, the identities of the source node and destination node of a service are manually entered 106, but in other examples, a list of (source node, destination node) pairs is entered manually, or read from an input file.

Figure 8B:
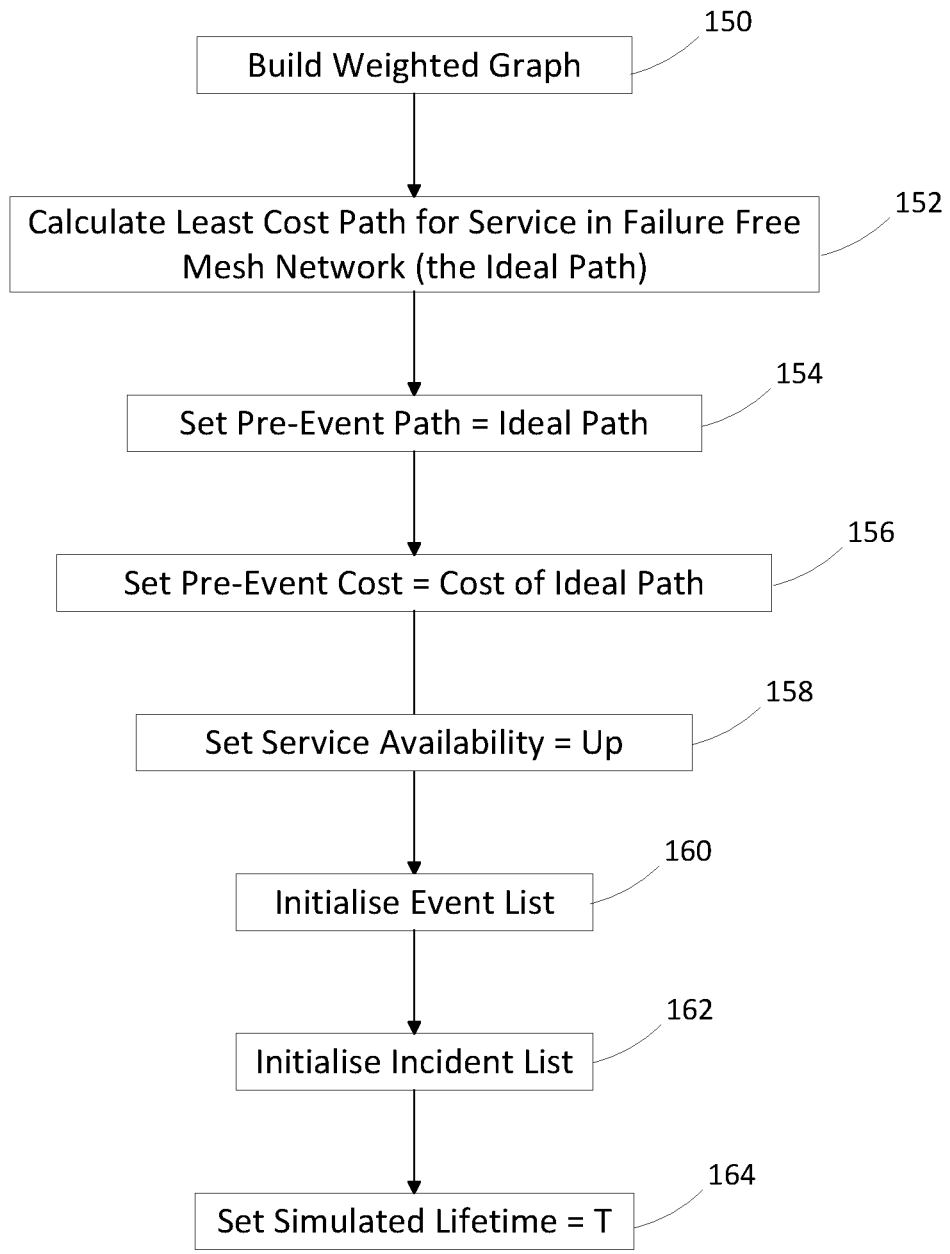
FIG. 8B shows the initialisation of variables in FIG. 8A in more detail.

The application then initialises variables 116. Turning to FIG. 8B, the initialisation of variables begins by building 150 a weighted graph data structure, based on the links table (FIG. 4), in which vertices represent the nodes of the mesh network and edges represent the links of the mesh network. In this example, the graph initially represents the mesh network free of failures. Thereafter, the least cost path for the service over the graph is calculated 152 using Dijkstra's routing algorithm—an example of a least cost routing algorithm. The calculated path for the service in the network in a failure-free state (conveniently referred to herein as the 'ideal' path) is then stored. A pre-event path variable is then initialised 154 to the ideal path, and a pre-event cost variable 156 is initialised to the cost of the ideal path. A service availability variable which keeps track of whether the service is available, and which has two possible values 'Up' and 'Down', is initialised 158 to 'Up'. The event 46 and incident 48 tables are then initialised (160, 162). The simulated lifetime is then set 164. In this particular example, the simulated lifetime is set to twenty years, but any reasonable length of time could be used instead.

Returning to FIG. 8A, N lifetimes, each having a duration of T hours are then simulated (120, 122). In this example, each simulation of a network lifetime involves generating events, recording changes in the path over which the service is provided, recording periods of loss of service which would result from those events, and, in this example, finding the total downtime, number of path changes, and number of incidents which occur during the lifetime. A running total of the downtime and number of incidents over the N lifetimes is kept.

Once the N lifetimes have been simulated, estimates of several performance measures for the service offered over by the proposed network design are calculated 128.

A test 129 is then performed to find whether the performance measures calculated for the service as provided by the proposed network design meet the predetermined performance criteria.

If those criteria are not met, then other proposed network designs are assessed. If, however, those criteria are met, then the proposed network design is output for provisioning. In this example the proposed network design is represented by the links table and link components table (or other representation of the arrangement of link components). The network operator then provisions a network in accordance with the proposed network design.

Figure 9A:
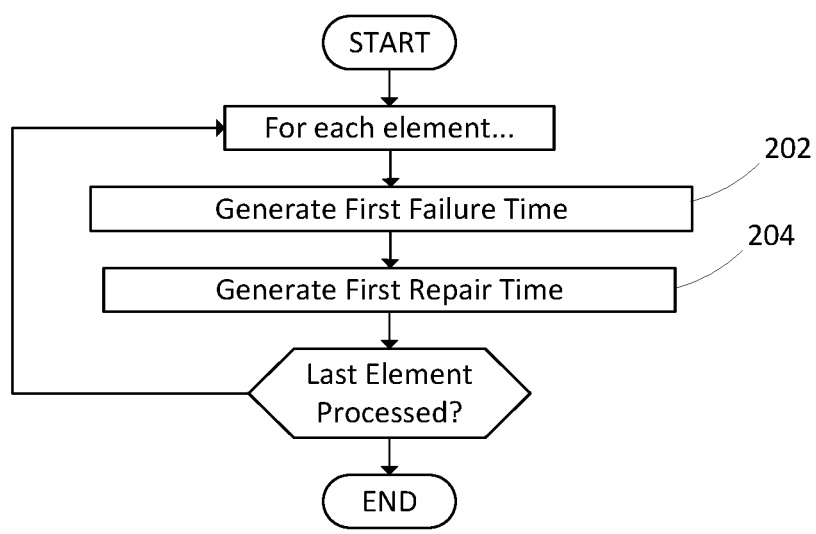
FIGS. 9A and 9B are flow-charts showing how each network lifetime is simulated and how running totals of performance measures over the lifetimes so far simulated are kept.
Figure 9B:
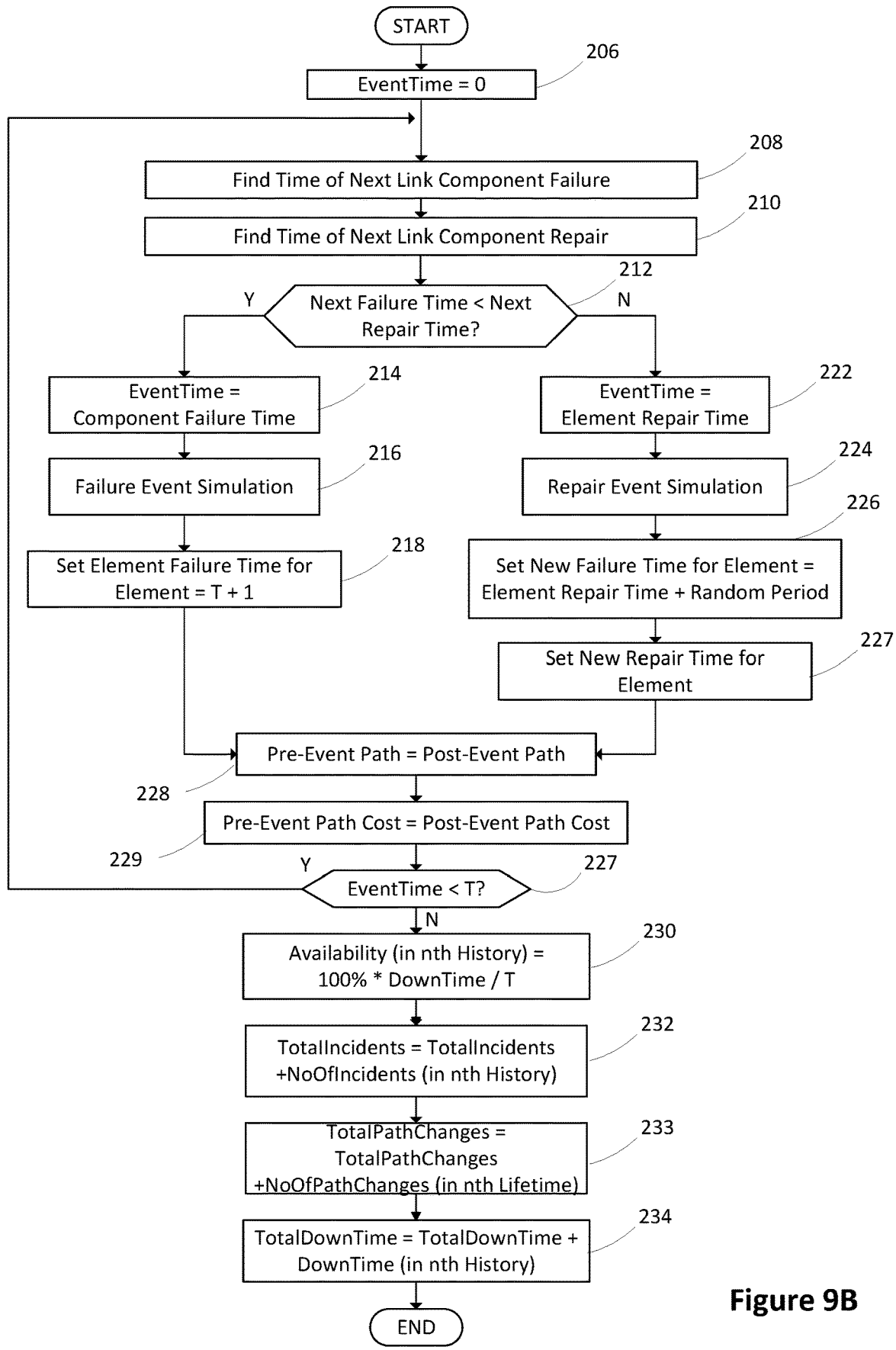

FIGS. 9A and 9B show the simulation of each network lifetime in more detail. The simulation begins with stochastically generating 202 a first failure time for each link component in the link components table.

In this example, a failure is generated for each link component by generating a random number for each link component (in this particular case a random number (RAND( )) between zero and one) and then calculating a failure time for that element in accordance with equation 1 below:

$$\text{Failure Time} = (10^{\wedge}9/\text{Failures per } 10^{\wedge}9 \text{ hours}) * LN (1/(1-\text{RAND}(\ ))) \quad \text{Equation 1}$$

The failures per billion hours is found in the third field of each record in the link components table. It will be seen how the failure time takes account of the reliability data provided for the link component.

Those skilled in the art will recognise that equation 1 assumes that failure times of link components are exponentially distributed with a decay constant proportional to the failures per unit time. Other probability density functions could be used—for example a Weibull distribution—in which case two failure-related parameters would need to be given in the link component file, and the failure rate of each link component would increase with age. Different probability distributions could be used for different types of link components.

The failure time generated for each link component is placed in the seventh field of the link components table (FIG. 5, 62).

A repair time for each link component is then calculated 204 by again generating a random number for each repair, and then calculating a time taken to repair the failure in accordance with the equation $$\text{Time Taken to Repair Failure} = \text{NORMINV}(\text{RAND}(\ ), \text{MTTR}, \text{MTTR}/4) \quad \text{Equation 2}$$

where MTTR is the Mean Time to Repair (found in the fourth column of the link components table) and NORMINV( ) is a function which returns the inverse of the normal cumulative distribution for the specified mean and standard deviation (the specified mean in this case being the Mean Time to Repair, and the standard deviation being taken to be one quarter of the Mean Time to Repair). Those skilled in the art will realise that the above equation assumes that the repair times are normally distributed around the Mean Time to Repair. Other probability distributions could be assumed (e.g. a Poisson distribution), or, in some embodiments, the time taken to repair the failure could simply be taken to be the same fixed amount of time in every case. Different fixed durations or different probability distributions could be applied to the repair of different types of link components.

The repair time generated for each element is added to the time of the failure of the link component and is placed in the eighth field of the link components table (FIG. 5, 64).

Turning to FIG. 9B, an EventTime variable is then set 206 to zero. The application then steps through the failure and repair events in chronological order by repeatedly carrying out a next event handling process (208-220).

Each iteration of the next event handling process (208-220) begins by finding 208, 210 the next failure time and the next repair time in the link components table and then, if the earliest of those two times is a failure time, carries out a failure handling routine (214-218), or otherwise carries out a repair handling routine (222-228).

The failure handling routine begins by setting 214 the EventTime variable to the failure time. A failure event simulation 216 is then carried out (which will be described below with reference to FIG. 10A). This is followed by the failure time for the link component subject to the failure being set 218 to a time after the expiry of the simulated network lifetime.

The repair handling routine similarly begins by setting 222 the EventTime variable to the time of the repair event. A repair event simulation 224 is then carried out (which will be described below with reference to FIG. 10B). A next failure time for the link component subject to the repair is then calculated 226 by adding a time period calculated using Equation 1 above to the time of the repair event. A corresponding repair time is then calculated 227 using Equation 2 above and added to the failure time calculated in the previous step. In the link components table, the new failure and repair times are substituted for the failure and repair times currently associated with the link component subject to the repair.

For both failure and repair events, a pre-event path variable is then set 228 to the post-event path following the event simulation (216 or 224)—this allows the post-event path following an event simulation to form the pre-event path for the next event simulation. Similarly, a pre-event path cost variable is then set 229 to the post-event path cost following the event simulation just performed.

The EventTime (now set to the time of the failure or repair event just processed) is then compared 220 to the expiry time of the simulation. If the EventTime is before the expiry time of the simulated lifetime, then the event handling process (208-220) is repeated. If the EventTime is at or after the expiry time, then performance measures for the network lifetime currently being simulated are found (230-234).

In this example, the performance measures calculated or updated (230-234) after each network lifetime simulation include three availability measures:

i) the availability, expressed as a percentage, which is calculated 230 for each lifetime as the total downtime (the calculation of which will be explained below in relation to FIGS. 10A and 10B) divided by the length of the lifetime;
 ii) a running total over lifetimes of the total number of periods of non-availability of the service ('incidents'), and
  iii) a running total over lifetimes of the total downtime;
 and a path stability measure:
 iv) a running total over lifetimes of the total number of changes in the path over which the service is provided.

Figure 3:
FIG. 3 is a table including exemplary reliability data for each link component in a mesh network to be simulated, and a dependency mapping indicating the dependency of links on link components.

The failure event simulation 216 is shown in more detail in FIG. 10A. It begins with an identification 300 of any links whose operation is dependent upon the link component using the link component ID and dependent links fields in the link components records (FIG. 3, items 50 and 60).

The operational dependency of links on link components is a many-to-many mapping—in addition to the case of the failure of one link component causing the failure of one link, in other cases the failure of one link component (e.g. a duct) can cause the failure of many links, and, in yet other cases, the failure of many link components in the same link can result in the failure of just that link.

Having identified 300 the link failures which are consequent upon the link component failure, the graph data structure representing the nodes and links of the mesh network is updated 302 by raising the costs of the edges representing the failed links by one million. It should be noted that in this example, a node is treated as a link component—and all the links connected to that node are recorded as operationally dependent on that node.

The link component failure event is then recorded 304 in the event table (FIG. 6). The lifetime number is set to the current iteration count n of the lifetime loop, the time of the link component failure event is set to the EventTime set (FIG. 9B, 214) immediately before the failure event simulation, the type of event is set to 'failed', the post-event least cost path and its cost are recorded, and the service availability field is set to the current service availability.

A test 306 is then carried out to find whether the pre-event path includes any edges representing links which have failed owing to the link component failure event.

If the test 306 finds that the pre-event path does not include edges representing links which have failed owing to the link component failure event, then the least cost routing process, a path change handling routine, and a service loss handling process described below, are skipped. This improves overall efficiency of the network design testing application since the significant burden of running a least cost routing algorithm by is only placed on the CPU of the computer in situations where the link component failure could result in loss of the service.

If, on the other hand, the test 306 finds that the pre-event path does include such edges then a least cost routing process (308-314) is run. The least cost routing process begins with the application 308 of Dijkstra's shortest path routing algorithm to the graph data structure to find the post-event path—i.e. the least cost path connecting the vertex representing the source node with the vertex representing the destination node, and the cost of that path.

A path stability test 310 is then carried out. If the post-event path differs from the pre-event path, then a variable tracking the number of changes in the path in the nth lifetime is incremented 312. Otherwise, the variable remains unchanged.

The event record (created in earlier step 304) is then updated to take account of the least cost routing algorithm having been run. The type of event is reset to 'failed, rerouted' (although it will be appreciated that the path calculated using Dijkstra's algorithm might in fact be the same as the path used before the current failure event), and the post-event path and the cost of the post-event path are also recorded.

A further test 316 is then carried out to find whether the post-event path cost is greater than one million.

If the post-event path cost is higher than one million (other thresholds could, of course, be used provided the cost representing a link component failure in a link is much greater than the operational cost of any loop-free path through the graph), and was less than one million prior to the failure event, then a service loss handling routine (318-326) is run. The service loss handling routine begins with the service availability variable being set 318 to 'Down', and being recorded in the event table. Thereafter, an incident start variable is set 322 to the EventTime. In this example, the simulation is improved by overwriting 324 the estimated repair time for each link component which is currently down with an expedited repair time (Equation 2 is again used, but the Mean Time to Expedited Repair (FIG. 3, 56) is used in place of the Mean Time To Repair). Finally, the number of incidents in the current lifetime is incremented 326. The service loss handling routine then ends.

If, on the other hand, the test 316 finds that post-event cost is less than a million, then the service loss handling routine is skipped and the failure event simulation ends.

The repair event simulation 224 is shown in more detail in FIG. 10B. It begins with an identification 400 of any links which are dependent upon the repaired link component using the link component ID and dependent links fields in the link components records (FIG. 3, items 50 and 60).

Having identified 400 the affected links, the graph data structure representing the nodes, links and link costs of the mesh network is updated 402 by reducing the costs of the edges representing the partially or fully repaired links by one million. The event is then recorded 404 in the event table (FIG. 6). The lifetime number is set to n, the time of the event is the EventTime set (FIG. 9B, 222) immediately before the repair event simulation, the type of event is set to 'repaired', the post-event path is (at least initially) set to the pre-event path, the post-event path cost is (at least initially) set to the pre-event path cost, and the service availability field is set to the current value of the service availability.

A test 406 is then carried out to find whether the service is down or the pre-event path is not the 'ideal' path (set in FIG. 8B, 152).

If the test 406 finds that neither condition is met, then the least cost routing process, a path change handling routine, and a service recovery handling routine described below, are skipped. This improves overall efficiency of the network design testing application since the significant burden of running the least cost routing algorithm is only placed on the CPU of the computer in situations where a link component repair could result in recovery of the service.

If, on the other hand, the test 406 finds that either condition is met, then a least cost routing process (408-414) is run. The least cost routing process begins with the application 408 of Dijkstra's shortest path routing algorithm to the updated graph data structure to find the post-event path connecting the vertex representing the source node with the vertex representing the destination node, and the cost of that path.

A path stability test 410 is then carried out. If the post-event path differs from the pre-event path, then a variable tracking the number of changes in the path in the nth lifetime is incremented 412. Otherwise, the variable remains unchanged.

The event record (created in earlier step 404) is then updated 414 to take account of the least cost routing algorithm having been run. The type of event is reset to 'repaired, rerouted' (although it will be appreciated that the post-event path might in fact be the same as the pre-event path).

A further test 416 is then carried out to find whether the post-event path cost is lower than one million but was higher than one million prior to the repair event, then a service availability recovery handling routine (418-424) is run. The service availability recovery handling routine begins with the service availability variable being set 418 to 'Up'. Thereafter, an incident start record is created and added 422 to the incident table (FIG. 7). The number of the simulated lifetime in which the incident occurred is recorded in the first field 90, the incident start time (in hours after the start of the simulation) is written into the second field 92, the year of the simulated lifetime in which incident occurred is recorded in the third field 94, and, in the fourth field 96, the duration is set to the difference between the EventTime and the incident start time. Finally, a cumulative running total of the service downtime is incremented 424 by the duration of the incident. The service availability recovery handling routine then ends.

On the other hand, if the test 416 finds that the post-event path cost is above one million, or the pre-event cost was below one million, then the service availability recovery handling routine is skipped and the repair event simulation ends.

Figure 11:
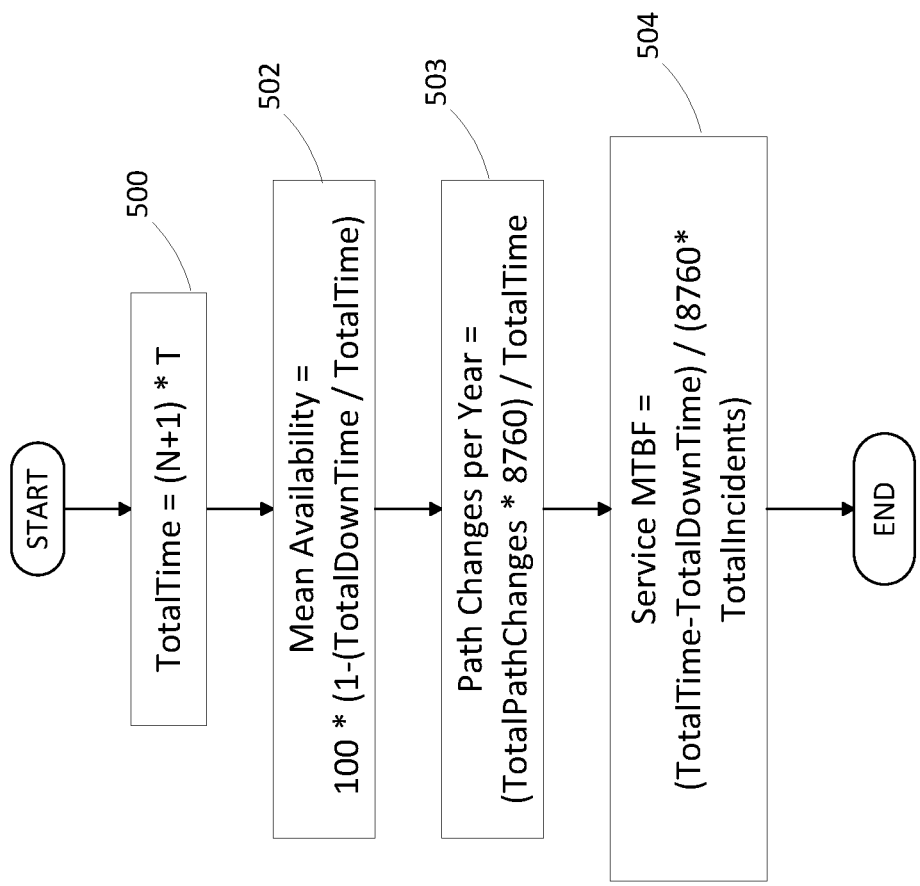
FIG. 11 is a flowchart showing how performance measures for a service offered over a mesh network are calculated once the predetermined number of network lifetimes have been simulated.

The calculation of estimates of performance measures (FIG. 8A, 128) for the service over the mesh network is shown in more detail in FIG. 11. The calculation begins with a calculation 500 of the total time simulated (in this case the product of the number of network lifetimes simulated and the simulated lifetime T). The mean availability 502 is then calculated as the percentage of the simulated time for which the service was available. Finally, the Mean Time Between Failures of the service is calculated 504 as the total time for which the service was available divided by the total number of incidents. In this particular example, the units are converted from hours to years by dividing the result by 8760.

It will be seen how the above embodiment obviates the need to exhaustively list mesh network states which adversely affect the performance of the mesh network by representing the mesh network as a graph, and using a graph search algorithm to evaluate a path from a vertex representing a source node to a vertex representing a destination node.

Possible variations to the above embodiment include:

i) in the above embodiment, link component failures and repairs were simulated taking account of link component reliability data, and those component failures were translated into link failures. In other embodiments, link failures could be instead be simulated taking into account link reliability data (which itself could be derived from link component reliability data). Also, in the above embodiment, node failures were simulated taking into account node reliability data, and translated into link failures. In other embodiments, node component failures could be simulated taking account of node component reliability data, and translated into node failures. Examples of node components which could be modeled include power supplies, fans, routing cards and the chassis of a router.

ii) in the embodiment described above with reference to the accompanying figures, a first failure and repair event was generated for each node or link component, each event having a time associated with it, prior to applying those events, and later-generated events, in chronological order, to the graph representing the nodes and links of the network. In other embodiments, a node or link could be randomly selected to fail to generate a subsequent iteration of the graph representing the network. Randomly selecting a node or link to fail could involve randomly selecting a node component or link component to fail, and finding any consequential failure of a node and/or link. The random selection could take account of the relative likelihood of failure of different nodes or links (or node components or link components), taking account of reliability data for the nodes or links (or node components or link components). The percentage of iterations for which there is a path through the iteration of the graph from the source node to the destination node could then be used in finding a performance measure for a service (for example, the availability of the service).

iii) in some versions of the embodiment described in item ii) above, a time could be ascribed to the failure or repair which is later than the time ascribed to a previous failure or repair. The time could take account of the number or nodes and links in the network (in a network with more nodes and links, an instance of failure amongst those nodes or links could be expected to happen more quickly than in a network having fewer nodes or links). Times of service loss and service recovery could then be used to calculate an estimated of the availability of a service provided by the network design.

iv) in the embodiment described above with reference to the accompanying figures, a least cost routing algorithm was used to establish a least cost path for providing the service, and the inclusion of a failed edge in that least cost path was taken as an indication that the service would be unavailable. However, in other embodiments, whether the service is available in the network state is assessed using a different graph searching technique—for example a breadth-first or depth-first search of the graph.

v) in the embodiment described above with reference to the accompanying figures, Dijkstra's algorithm was used to find the least cost path in the graph. Other least cost routing algorithms could be used instead—one example being the Bellman-Ford routing algorithm.

vi) in the embodiment described above with reference to the accompanying figures, the results from a plurality of simulated lifetimes, each corresponding to a feasible network lifetime, were combined. However, in embodiments where the link component reliability data do not depend on age of the link component, instead the simulated duration of network operation could be many times greater than a feasible network lifetime.

vii) in the embodiment described above with reference to the accompanying figures, the failure (or repair) of a link component upon which a link depends was represented in the weighted graph by increasing (or decreasing) the weight of the link. In other embodiments, edges representing a link subject to one or more link component failures could instead be removed from the graph.

viii) whilst in the above embodiment described above with reference to the accompanying figures, data was stored in tables or files of records, any form of data structure could be used.

ix) whilst in the above embodiment described above with reference to the accompanying figures, times of events and durations of incidents were given in hours, other units of time could be used.

x) the computational efficiency of the embodiment described above with reference to the accompanying figures could be improved further by storing paths through the graph for network states in which only a single link has failed (in practice, having two or more links down simultaneously is a rarely encountered network state). The paths could be stored in a table indexed by an identifier of the failed link component, for example. The paths could either be calculated in advance or they could be stored each time a new single link failure is encountered. Such an embodiment would still offer the benefit of not having to find and list all the network states which adversely impact the performance of the network.

xi) planned works could be represented in the simulation by treating the planned start time of the planned works as a failure event of the components to be taken out of service, and the planned completion time of the planned works as a repair event of the components to be taken out of service.

In summary of the above disclosure, a method of provisioning mesh communication networks is disclosed. The method involves simulating the performance of a proposed network design to ensure the proposed network design meets service level criteria before provisioning a network in accordance with the proposed network design. Such simulations are required to be comprehensive because highly improbable events can be sufficient to result in a mesh network not meeting the stringent performance criteria which such networks are required to meet. Known methods of provisioning rely on exhaustively listing the mesh network states which would adversely impact the service offered by a proposed network design as part of simulating the performance of the proposed network design—this is an error prone exercise since relevant network states can be missed. A simulation technique is proposed in which the network state after each event is represented by a weighted graph indicating a measure of path cost for each of the links in the mesh network. A graph searching algorithm is applied to seek a path across the graph, thereby systematically exploring paths over mesh network which could provide a suitable route for the service in the simulated network state represented in the graph. Networks are thus provisioned which meet stringent performance criteria without being over-engineered.

The invention claimed is:

1. A computer-implemented method of provisioning a mesh communications network according to a network design, the design defining an arrangement of nodes and links therebetween for providing a service involving communication between a source node and a target node, the method comprising:
　modelling the network design as a graph data structure in which edges correspond to links and vertices correspond to nodes;
　iteratively adjusting the graph to represent failures and corresponding repairs to nodes and/or links, and for selected graph adjustments including graph adjustments relating to failures and graph adjustments relating to repairs, evaluating a path through the network from the source node to the target node so as to estimate a measure of the performance of the network design across the iterations, and testing a state of the network at a time of repair of the node or link;
　provisioning the mesh network responsive to the measure of performance satisfying a predetermined criterion;
wherein:
　the plurality of failures and corresponding repairs are represented by:
　　i) a plurality of node or link failure events, each relating to a node or link in the mesh network and including a stochastically generated time of failure of the node or link; and
　　ii) a plurality of corresponding node or link repair events, each including the time of repair of the node or link; and
　adjusting the graph comprises applying the failure or repair events in chronological order to adjust the graph representing the mesh network from a pre-event iteration to a post-event iteration for each failure and repair event.

2. The method according to claim 1 in which, evaluating a path so as to estimate a measure of the performance of the network design across the iterations comprises seeking a path so as to evaluate availability of the service across the iterations.

3. The method according to claim 1 wherein evaluating a path comprises:
　for each graph adjustment:
　　i) recording a time of service loss if a path was available before the graph adjustment, but no path is available following the graph adjustment; and
　　ii) recording a time of service recovery if no path was available before the graph adjustment, but a path is available following the graph adjustment;
　evaluating availability of the service across the iterations by calculating estimates of one or more measures of the availability of the service from the recorded times of service loss and service recovery.

4. The method according to claim 1 further comprising stochastically generating the times of node or link failure events.

5. The method according to claim 4 further comprising generating the corresponding node or link repair events.

6. The method according to claim 1 in which the graph comprises a weighted graph, wherein the weights represent a measure of path cost based on attributes of edges included in the path, and evaluating a path through the network comprises performing a least cost routing algorithm to seek a least cost path from a vertex representing the source node to a vertex representing the destination node.

7. The method according to claim 6 wherein the selected graph adjustments are selected by only seeking a path through the network from the source node to the target node if the graph adjustment indicates the failure of a link on the current least cost path.

8. The method according to claim 1 in which the failures take account of node or link reliability data.

9. The method according to claim 1 further comprising operating the computer to store an operational dependency mapping representing an operational dependency of one or more links in the mesh network on one or link components, wherein adjusting the graph includes mapping a link component failure event or link component repair event to a change to one or more edges in the graph based on the operational dependency mapping.

10. The method according to claim 9 wherein updating the graph includes attributing a cost to an edge of the graph indicative of a number of link components which would need to be repaired in order to return a link represented by the edge to an operational state.

11. The method according to claim 1 wherein the estimate of the availability of the service comprises a probability distribution of availability measures.

12. A non-transitory computer-readable storage medium tangibly storing instructions which, when executed on a computer, cause the method of claim 1 to be performed.

13. The method according to claim 1 wherein the measure of performance comprises the availability of the path from the source node to the target node, the method further comprising recording times of failure and repair events across the iterations on a common timeline.

14. A computer system comprising: a processor and memory storing computer program code for provisioning a mesh communications network according to a network design, the design defining an arrangement of nodes and links therebetween for providing a service involving communication between a source node and a target node, the computer system being at least configured to:
model the network design as a graph data structure in which edges correspond to links and vertices correspond to nodes;
iteratively adjust the graph to represent failures and corresponding repairs to nodes and/or links, and for selected graph adjustments including graph adjustments relating to failures and graph adjustments relating to repairs, evaluate a path through the network from the source node to the target node so as to estimate a measure of the performance of the network design across the iterations, and test a state of the network at a time of repair of the node or link;
provide the mesh network responsive to the measure of performance satisfying a predetermined criterion;
wherein:
the plurality of failures and corresponding repairs are represented by:
i) a plurality of node or link failure events, each relating to a node or link in the mesh network and including a stochastically generated time of failure of the node or link; and
ii) a plurality of corresponding node or link repair events, each including the time of repair of the node or link; and
adjust the graph comprises applying the failure or repair events in chronological order to adjust the graph representing the mesh network from a pre-event iteration to a post-event iteration for each failure and repair event.

15. The computer system according to claim 14 wherein the measure of performance comprises the availability of the path from the source node to the target node, the computer system is further configured to record times of failure and repair events across the iterations on a common timeline.

16. The computer system according to claim 14 wherein the computer system is further configured to:
for each graph adjustment:
i) record a time of service loss if a path was available before the graph adjustment, but no path is available following the graph adjustment; and
ii) record a time of service recovery if no path was available before the graph adjustment, but a path is available following the graph adjustment;
evaluate availability of the service across the iterations by calculating estimates of one or more measures of the availability of the service from the recorded times of service loss and service recovery.

17. The computer system according to claim 14 wherein the computer system is further configured to stochastically generate the times of node or link failure events, and generate the corresponding node or link repair events.

18. The computer system according to claim 14 wherein the graph comprises a weighted graph, wherein the weights represent a measure of path cost based on attributes of edges included in the path, and the evaluation of the path through the network comprises performance of a least cost routing algorithm to seek a least cost path from a vertex representing the source node to a vertex representing the destination node; and the selected graph adjustments are selected by only seeking a path through the network from the source node to the target node if the graph adjustment indicates the failure of a link on the current least cost path.

19. The computer system according to claim 14 wherein the computer system is further configured to store an operational dependency mapping representing an operational dependency of one or more links in the mesh network on one or link components, wherein the adjustment of the graph includes mapping a link component failure event or link component repair event to a change to one or more edges in the graph based on the operational dependency mapping.

20. The computer system according to claim 19 wherein the computer system is further configured to attribute a cost to an edge of the graph indicative of a number of link components which would need to be repaired in order to return a link represented by the edge to an operational state.

* * * * *